United States Patent [19]
Gaylord

[11] 3,708,555
[45] Jan. 2, 1973

[54] GRAFTING OF A MIXTURE OF STYRENE AND MALEIC ANHYDRIDE ONTO BACKBONE POLYMERS CONTAINING ACTIVE OR LABILE HYDROGEN ATOMS

[75] Inventor: Norman G. Gaylord, New Providence, N.J.

[73] Assignee: Gaylord Associates, Newark, N.J.

[22] Filed: Feb. 24, 1970

[21] Appl. No.: 13,768

[52] U.S. Cl...................260/878 R, 8/54.2, 8/162, 8/163, 117/161, 161/182, 161/192, 161/216, 161/220, 161/239, 161/270, 162/157 C, 162/157 R, 204/159.17, 260/9 R, 260/17 A, 260/29.6, 260/32.8 A, 260/33.4 PQ, 260/41 A, 260/41 AG, 260/41 B, 260/41 C, 260/41 R, 260/827, 260/836, 260/848, 260/857, 260/859, 260/873, 260/877, 260/879, 260/881, 260/884, 260/885, 260/886, 260/DIG. 31, 260/DIG. 43

[51] Int. Cl...........................C08f 1/02, C08f 19/02

[58] Field of Search..260/878 R, 879, 884, 886, 881, 260/880

[56] References Cited

UNITED STATES PATENTS

| | | | |
|---|---|---|---|
| 3,166,607 | 1/1965 | Cernia et al. | 260/878 R |
| 3,177,270 | 4/1965 | Jones et al. | 260/878 R |
| 3,306,954 | 2/1967 | Moore | 260/886 |

FOREIGN PATENTS OR APPLICATIONS

| | | | |
|---|---|---|---|
| 984,731 | 3/1965 | Great Britain | 260/884 |
| 850,471 | 10/1960 | Great Britain | 260/878 |
| 24,265 | 10/1964 | Japan | 260/878 |

OTHER PUBLICATIONS

Polymer Letters, 8, pp 549–53 (1970)
Kirk–Othmer, Encyclopedia of Chemical Technology, 12, p. 820, J. Wiley & Sons, New York (1967)
Encyclopedia of Polymer Science and Technology, 1, p. 68, J. Wiley & Sons, New York (1964)
Kirk–Othmer Encyclopedia of Chemical Technology, 19, pp. 56–7, J. Wiley & Sons, New York (1969)
Heilbron (Ed.), Dictionary of Organic Compounds, III, p. 203, Oxford Univ. Press, New York (1953)
Heilbron (Ed.), Dictionary of Organic Compounds, IV p. 2043, Oxford Univ. Press, New York (1965)
Lange, Handbook of Chemistry (Sixth Ed.), p. 538–9

*Primary Examiner*—Harry Wong, Jr.
*Assistant Examiner*—A. Holler
*Attorney*—E. J. Berry and L. Rosen

[57] ABSTRACT

A process for preparation of carboxyl containing polymer products which comprises reacting polymers having active or labile hydrogen atoms with a mixture of styrene and maleic anhydride and carboxyl containing polymer products prepared thereby.

15 Claims, No Drawings

GRAFTING OF A MIXTURE OF STYRENE AND MALEIC ANHYDRIDE ONTO BACKBONE POLYMERS CONTAINING ACTIVE OR LABILE HYDROGEN ATOMS

The invention relates generally to novel polymers containing free carboxyl groups and a process for the preparation thereof, and more particularly relates to a method for incorporating carboxylic acid groups into polymers by reacting a mixture of styrene and maleic anhydride with a polymer or copolymer containing at least a limited number of labile hydrogen atoms and to modified polymer products obtained thereby.

An object of the present invention is to provide new and novel carboxyl-containing polymers characterized by having free carboxyl groups therein.

Another object of the invention is to provide carboxyl-containing polymers which cannot be made satisfactorily by known processes.

Another object of the present invention is to provide a new and novel process for the preparation of carboxyl-containing copolymers.

A further object is to react a mixture of styrene and maleic anhydride with polymers having active hydrogen atoms and thereby obtain modified polymer products having free carboxylic acid groups.

Other and further objects will become obvious from the detailed description of the invention presented hereinbelow.

It is known to be commercially desirable to have carboxyl functionality incorporated into a polymeric structure. Various methods are known for achieving this functionality. Such carboxyl-containing polymers are characterized by their ability to participate in the formation of covalent, ionic and hydrogen bonds. As a result of this modification, the solubility properties, receptivity to dyes, adhesion to polar and non-polar substrates including metals, permeability to gases including water vapor, interaction with fillers and reinforcing agents, compatibility and the ability to form polymer alloys of the polymers are greatly improved.

The prior art teaches that certain carboxyl-containing polymers may be prepared by the copolymerization of an ethylenically unsaturated carboxylic acid with a suitable comonomer. This method is limited to monomers which copolymerize with the unsaturated carboxylic acid and to processes which are not made inoperable by the presence of an unsaturated carboxylic acid. Thus, an unsaturated carboxylic acid cannot be incorporated using a polymerization system involving organometallic catalysts, for example, as in the polymerization of ethylene to a high density polyethylene using an aluminum alkyl-titanium halide catalyst, in the polymerization of butadiene to essentially all cis-1,4-polybutadiene with an alkyl aluminum halide-cobalt octoate catalyst, in the polymerization of propylene to polypropylene with an aluminum alkyl-titanium halide or alkylaluminum halide-titanium halide catalyst and in the copolymerization of ethylene and propylene to an ethylene-propylene copolymer with an alkylaluminum halide-vanadium oxychloride catalyst.

An alternative method for preparing a carboxyl-containing polymer is the grafting of an unsaturated acid on a polymer skeleton. For instance, acrylic or methacrylic acid can be grafted on polyethylene by the use of high energy ionizing radiation (U.S. Pat. No. 3,211,808) while maleic anhydride is grafted on polyethylene by the use of benzoyl peroxide or azobisisobutyronitrile in the presence of air (Gabara and Porejko, J. Polymer Sci., A-1, 5, 1539 (1967). The need for special equipment is an obvious disadvantage of the radiation technique and, in addition thereto the formation of considerable amounts of homopolymer and/or the cross-linking of the base polymer are disadvantages of both these processes.

Another method for incorporating carboxyl groups into a polymer is the reaction of unsaturated polymer with a carboxylic acid. Using this technique, a polyethylene wax with a molecular weight of from 1,000 to about 5,000 and containing olefinic linkages is prepared by the pyrolysis or thermal degradation of high molecular weight polyethylene. The thus produced polyethylene wax is reacted with a carboxylic acid reagent such as maleic anhydride either in a melt or in solution (French Pat. No. 1,346,533). The disadvantage of this process is its relatively severe limitation to unsaturated polymers.

Still another method for incorporating carboxyl groups in a polymer involves the ultraviolet irradiation of a solution containing an aromatic polymer such as polystyrene and maleic anhydride, as a result of which irradiation, the aromatic ring forms an adduct with the maleic anhydride (U.S. Pat. No. 3,214,416). This process is also limited in scope since it requires special equipment and is only useful for polymers containing aromatic rings.

Surprisingly, it has now been discovered that the addition of a mixture of styrene and maleic anhydride to a polymer or copolymer which contains labile or active hydrogen atoms, in the absence of a radical catalyst, results in the formation of a carboxyl-containing polymer. This novel process is very broadly applicable to homopolymers and copolymers of all kinds.

In contrast to the known process of grafting of polymeric branches onto a substrate polymer by generation of free radical sites on the latter as a result of hydrogen abstraction by a radical derived from a free radical precursor or irradiation or shear, the carboxylation reaction of the present invention involves the insertion of a monomeric styrene-maleic anhydride charge transfer complex or a dimer or trimer thereof into a carbon-hydrogen bond of the substrate or "trunk" polymer or copolymer.

The so-called "trunk" polymers which can be effectively carboxylated by the process of the present invention constitute a broad group and may be any homopolymers or copolymers containing hydrogen atoms at least 10 percent of which are active or labile hydrogen atoms, such hydrogen atoms falling into one or more of the following categories;

1. hydrogen atoms on tertiary or trisubstituted carbon atom,

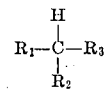

2. hydrogen atoms on benzylic or allylic carbon atom,

3. hydrogen atoms on a carbon atom adjacent to an electron donor atom,

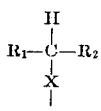

wherein X is nitrogen, sulfur or oxygen or other electron donor atom.

4. hydrogen atoms on a carbon atom adjacent to an electron acceptor group,

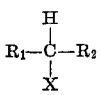

wherein X is carbonyl, carboxyl, carboxamide, carboxylate, thiocarbonyl, thiocarboxyl, thiocarboxamide, thiocarboxylate, nitrile, nitro, sulfonyl or other electron acceptor group, 5. hydrogen atoms adjacent to a carbonyl group

6. hydrogen atoms adjacent to an electron donor atom

wherein X is nitrogen, sulfur or oxygen or other electron donor atom.

The aforesaid required active hydrogen atoms may be present on the skeleton of the "trunk" polymer or on pendant groups attached to the polymer.

Effective trunk or substrate polymers include but are not to be limited to polymers derived from one or more of the following monomers: ethylene, propylene, butenes, higher α-olefins, styrene, vinyltoluene, butadiene, isoprene, chloroprene, allyl acetate, allyl chloride, vinyl chloride, alkyl vinyl ether, vinyl acetate, acrolein, alkyl acrylate, alkyl methacrylate, acrylonitrile, α-methacrylonitrile, acrylamide, methacrylamide, acrylic acid, methacrylic acid, itaconic acid, alkyl vinyl sulfide, etc. The trunk polymer may be either linear or branched. Thus, linear polypropylenes, branched polyethylenes, and ethylene-propylene copolymers all contain tertiary carbon atoms and are effective and useful trunk polymers.

Modified polymers obtained by chemical modification of primary polymers are also effective substrate polymers. Thus, for example, chlorosulfonated polyethylene and chlorinated polyethylene are effective as substrates.

Ring opening, polyaddition and condensation polymers and copolymers are equally effective trunk polymers. Thus, poly(ethylene oxide), poly(propylene oxide), poly(ethylenimine), poly(ethylene sulfide), polyurethanes, polyesters, polyamides, urea-formaldehyde resins, melamine-formaldehyde resins, phenol-formaldehyde resins, silicones and poly[bis(chloromethyl)oxetane] are typical useful substrate polymers.

Block and graft copolymers as well as alternating copolymers are as effective as homopolymers and random copolymers provided they fullfil the above criteria for having labile or active hydrogen atoms.

Naturally occurring polymers such as cellulose, starch, gelatin, silk, gum arabic and leather as well as derivatives of natural polymers including cellulose esters, carboxymethyl cellulose, hydroxyethyl cellulose, oxidized cellulose, oxidized starch and cellulose nitrate are also useful as trunk polymers.

The substrate polymer is reacted with a mixture of styrene and maleic anhydride. Although maleic anhydride is insoluble in styrene at room temperature, an equimolar mixture of the two forms a homogeneous solution at 50°–60° C. In order to prevent contamination of the carboxyl-modified polymer with undesirable amounts of polystyrene or styrene-maleic anhydride copolymer, as well as to prevent the grafting of long branches of a styrene-maleic anhydride copolymer on the substrate polymer, the monomer mixture used, should contain 1–1.5 moles of styrene per mole of maleic anhydride and preferably 1 mole of styrene per mole of maleic anhydride.

In carrying out the process of the invention, the solution of maleic anhydride in styrene is added, in the absence of a free radical catalyst or solvent, to a molten or fluid polymer or copolymer which contains labile or active hydrogen atoms as hereinbefore characterized. The styrene solution of maleic anhydride is maintained at 50°–60° C. in order to prevent precipitation of the normally solid maleic anhydride. The polymer to which carboxylic groups are to be appended is heated to a temperature above 120° C. preferably 150°–250° C., in order to convert it to a molten or fluid state. The temperature to which the polymer is heated is determined by the deformation or softening point of the polymer, but in any case the temperature is preferably maintained above 120° C.

The polymer is subjected to mechanical deformation in a suitable mixing device in order to continually expose new surfaces of the polymer to the solution of maleic anhydride in styrene. Suitable mixing equipment includes a Banbury mixer, a Brabender Plasticorder, a rubber mill, a screw extruder or any other of the well-known mechanical mixing equipment normally used in the mixing compounding, processing or fabrication of thermoplastic, elastomeric or thermosetting polymers.

The maleic anhydride solution in styrene is maintained above 50° C. but below 70° C. and is added to the polymer which is being subjected to deformation at a temperature above 120° C. The maleic anhydride solution is added as rapidly as possible to the polymer substrate and the reaction time may be varied from 1 minute to 1 hour. The carboxylation reaction actually occurs practically instantaneously when the carboxylic anhydride acid solution comes into contact with the heated polymer although the mixing time may be extended in accordance with the time period and method necessary or available in order to discharge the reaction mixture from the mixing device.

The carboxyl content of the final carboxylated polymer product may be varied from 0.1 to 50 percent by weight of the initial polymer or copolymer by appropriate adjustment of reactant quantities.

The actual carboxyl content on a molar basis will depend upon the molecular weight of the original polymer and on the molecular weight of the monomer molecules in the polymer or copolymer. The carboxyl content of the final carboxylated product may be varied from one carboxyl group per two to 1,000 monomer units, the preferred range being one carboxyl group per two to 100 monomer units.

The carboxyl groups in the polymer products are appended to the substrate polymer in conjunction with styrene units. The carboxyl-containing sites may be represented as follows:

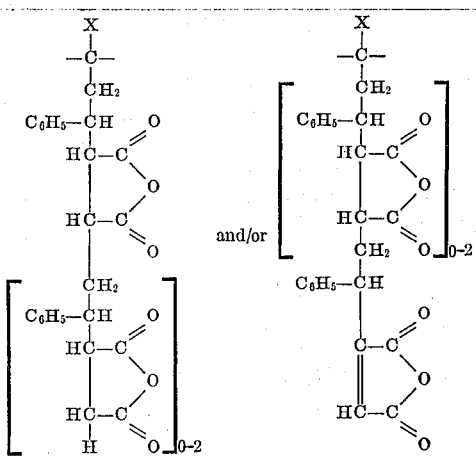

Differential thermal analysis and solubility properties of the thus carboxylated polymers indicate the absence of long segments of grafted styrene-maleic anhydride branches. The predominant structure contains one styrene-maleic anhydride unit per structural site on the original substrate polymer.

The invention will be illustrated in greater detail by the specific examples presented hereinafter but it is in no way intended to limit the invention or the claims thereto.

EXAMPLE 1

Carboxylation of Poly (n-butyl acrylate)

Thirty-five grams of poly (n-butyl acrylate) prepared by emulsion polymerization was reacted with a mixture of 5.4 g. of styrene and 5.1 g. maleic anhydride, according to the process of the invention.

Into a Brabender Plasticorder chamber which was set at 75 RPM and a temperature of 150° C. there were added the 35 g. of poly (n-butyl acrylate) which were allowed to flux. A separately prepared styrene-maleic anhydride solution was injected into the Brabender chamber using a hypodermic syringe and the Brabender was allowed to run for 10 minutes.

The reaction product was discharged and 41.7 g. of material recovered. The rubbery reaction product was cut into small pieces and extracted by methanol for 24 hours using a Soxhlet extractor. The methanol-insoluble portion was dried to constant weight at 40°–50° C. under vacuum.

The methanol-insoluble portion was dissolved in acetone with stirring and slight heating. The solution was cooled to room temperature and titrated with 0.1N methanolic KOH solution using a pH meter. The acid value was found to be 51 mg. KOH/g.

Since the carboxylated product should be converted to a half ester during the extraction by methanol, according to the following equation:

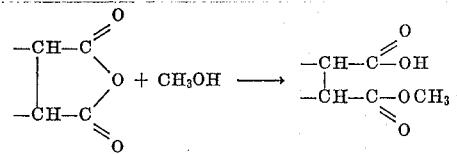

the above-determined acid value corresponds to the carboxyl group of the half ester. Therefore, the actual acid value for the reaction product containing anhydride groups was calculated as 105 mg. KOH/g. The carboxyl number of the anhydride-containing product, calculated from the acid value, was 0.19 carboxyl groups per 100 g. of product.

EXAMPLE 2

Carboxylation of Polystyrene and cis-Polybutadiene

Two hydrocarbon polymers, polystyrene and cis-polybutadiene, were reacted with the styrene-maleic anhydride carboxylation mixture in the Brabender Plasticorder.

The conditions of the carboxylations and the characteristics of the resulting products are summarized in Table I. The acid value was determined by suspending the carboxylated polymer in toluene, refluxing for 1 hour with methanolic KOH and back-titrating the unreacted KOH with 0.05N HCl in methanol. In accordance with common practice (Garrett and Guile, J. Am. Chem. Soc., 73, 4533 (1951) for polymers containing styrene-maleic anhydride units, the true acid value, reported in the table, was obtained by multiplying by two the value obtained by titration.

TABLE I

|  | 1. Polystyrene* | 2. cis-polybutadiene** |
|---|---|---|
| Polymer, g. | 35 | 35 |
| Styrene, g. | 5.4 | 5.4 |
| Maleic Anhydride, g. | 5.1 | 5.1 |
| Temp., °C. | 150 | 120 |
| Time, min. | 10 | 10 |
| Recovery, g. | 39 | 40.8 |
| Extraction Solvent | Methanol | Acetone |
| Insoluble portion (%) | 90.1 | 85.2 |
| Soluble portion (%) | 9.9 | 14.8 |
| Titration (insoluble portion) |  |  |
| COOH groups/100 g. sample | 0.16 | 0.03 |
| Acid value, mg. KOH/g. | 90 | 16 |

\* Prepared in toluene solution with benzoyl peroxide as polymerization catalyst; mol. wt. 40,500
\*\* Prepared with diethylaluminum chloride-cobalt compound catalyst; polymer product with high (98%) cis-1,4 structure used without removal of antioxidant.

EXAMPLE 3

Carboxylation of Miscellaneous Polymers using Styrene-Maleic Anhydride Carboxylation Mixture The general experimental procedure was to set the Brabender Plasticorder at 75 RPM and at the required temperature. The polymer was added and allowed to flux. The addition of maleic anhydride-styrene solution, kept at 50°–60° C. was carried out and the Brabender was run for an additional 10 minute period and discharged. The treated polymer was then pressed to give a film of about 2–3 mm. thickness. This sheet was cut into small strips and was then ground to 20 mesh powder using a cutting mill. The powder was then extracted with either acetone or methanol for 24 hours using a Soxhlet extractor. The portion insoluble in acetone or methanol was dried, titrated with methanolic sodium hydroxide and the acid value was then calculated. The portion soluble in acetone or methanol was concentrated and poured into benzene. The benzene insoluble part was found to be a styrene-maleic anhydride copolymer.

The details of the individual experiments and the results thereof are shown in Table II below. The acid value was determined as described in Example 2.

other shapes. The films or sheets can be readily printed or decorated, laminated to rigid or flexible substrates such as wood, paper, metals, thermoset polymers, other thermoplastic films, rubber sheeting, etc., used as adhesive films between plies in a multiply composite, e.g., wood-wood, wood-metal, metal-metal, as well as thermoplastic or thermoset polymer composites with wood, metal, glass, woven or non-woven fabrics or mats, paper, etc., pressure or vacuum-formed, stretched, oriented, heat-shrunk, vacuum metallized, coated with heat-sealable and/or barrier coating compositions. The presence of carboxyl groups in the polymer film in most cases will make it unnecessary to treat the film surface, e.g., by electrical discharge or flame, or apply an adhesive coating to promote adhesion.

The carboxyl-containing polymers may also be converted into films or sheets by calendering and flat-bed

TABLE II

| Polymer, g. (See key below) | Monomers, g. 1:1 molar ratio | Time, min., temp., °C. | Before, g. sample weight | After, g. sample weight | Insoluble in A or M, percent* | Soluble in A, insoluble in benzene, percent* | Acid value of fraction insoluble in A or M, mg. KOH/ g. sample | COOH groups/ 100 g. product |
|---|---|---|---|---|---|---|---|---|
| A | St 3.6 / MA 3.4 | 7.0 10/170 | 25(A) | 23.2 | 92.8 | 1.8 | 39 | 0.07 |
| B | St 3.6 / MA 3.4 | 7.0 10/150 | 25(A) | 24.9 | 98.6 | 1.0 | 45 | 0.08 |
| C | St 3.6 / MA 3.4 | 7.0 10/120 | 24.3(A) | 24 | 98.8 | Trace | 25 | 0.04 |
| D | St 3.6 / MA 3.4 | 7.0 10/100 | 24.5(A) | 22.5 | 92.0 | Trace | 17 | 0.03 |
| E | St 3.1 / MA 2.9 | 6.0 10/170 | 22.7(M) | 22.1 | 97.5 | 0.4 | 77 | 0.14 |
| F | St 3.6 / MA 3.4 | 7.0 10/170 | 25.4(A) | 24.4 | 96.2 | Trace | 25 | 0.04 |
| G | St 3.6 / MA 3.4 | 7.0 10/170 | 25.2(M) | 25.2 | 100 | Trace | 86 | 0.15 |
| H | St 3.6 / MA 3.4 | 7.0 10/170 | 25.5(A) | 21.5 | 84.3 | 7.2 | 6 | 0.01 |
| I | St 3.6 / MA 3.4 | 7.0 10/150 | 24.7(M) | 23.0 | 93.2 | Trace | 31 | 0.06 |
| J | St 3.6 / MA 3.4 | 7.0 10/150 | 25.3(A) | 24.3 | 92.2 | 0.1 | 14 | 0.02 |
| K | St 3.6 / MA 3.4 | 7.0 10/150 | 25.3(M) | 22.8 | 90.2 | Trace | 56 | 0.10 |
| L | St 3.6 / MA 3.4 | 7.0 10/150 | 25.2(A) | 24.6 | 97.5 | Trace | 76 | 0.14 |

*Calculated based on weight of sample before extraction.

STARTING POLYMERS AND IDENTIFICATION KEY

A - polypropylene - density 0.906, melt index 15, unstabilized
B - polyethylene - density 0.960, melt index 22
C - polyethylene - density 0.918, melt index 2
D - ethylene - propylene rubber (E 46%, P 54%)
E - medium molecular weight poly(vinyl chloride) containing 1% organo tin stabilizer
F - same as D
G - amorphous polypropylene
H - low molecular weight polyethylene - molecular weight 2000
I - acrylonitrile-butadiene-styrene (ABS) resin
J - polyethylene density 0.96, melt index 0.7
K - nitrile rubber with about 25% acrylonitrile content
L - same as D and F The carboxyl-containing polymers prepared by the process of the present invention may be fabricated into shaped objects by conventional fabrication methods. Due to the tendency of carboxyl-containing polymers to undergo intermolecular hydrogen-bonding, it may be necessary to increase processing temperature by 25°–50C. to improve the flow characteristics.

The carboxyl-containing polymers may be melt extruded into films, sheets, tubes, fibers, profiles and pressing. The incorporation of blowing agents permits the production of foamed film or sheeting.

The fibers produced from the carboxyl-containing polymers by melt spinning or film splitting may be converted into woven and non-woven structures. Due to the presence of carboxyl groups the non-woven webs or mats have greater strength than the webs or mats produced from the unmodified polymers and in many cases, e.g., carboxyl-containing polyolefins such as polyethylene or polypropylene, have paper-like characteristics. Both woven and non-woven structures may be coated or printed with conventional paper or textile coating and printing compositions to yield coated structures with good coating-substrate adhesion.

The carboxyl-containing fibers per se or in the form of woven or non-woven structures are readily dyed with basic dyes, metal-containing dyes and "reactive" dyes. The dyes may be incorporated in the polymer melt before spinning or extrusion.

The dyed or natural fiber mats or woven shapes may be laminated to substrates such as metals, wood, natural or synthetic fiber or film structures, etc. and yield composites with good interfacial adhesion.

The presence of carboxyl groups in the carboxyl-containing polymers increases the adhesion and compatibility with inorganic or organic fillers such as silicates (clay, talc, mica, asbestos, wollastonite), oxides (aluminum oxide, hydrated alumina, magnesium oxide, titanium dioxide, zinc oxide, quartz, diatomaceous earth), carbonates (calcium, barium and magnesium carbonates), hydroxides, carbon black, graphite, metal powders as well as glass in the form of powder, fibers or flake, lignin, keratin, wood flour, cotton flock and nylon, acrylic, alpha cellulose and rayon fibers. The fillers are generally blended with the carboxyl-containing polymers prior to extrusion into films or fibers.

Filled or unfilled carboxyl-containing polymers may be extrusion laminated onto suitable substrates such as wood, paper, metals, as well as structures prepared from thermoplastic or thermosetting resins.

The carboxyl-containing polymers per se or blended with dyes, pigments or fillers may be compressed or injection molded into shaped objects.

The carboxyl-containing polymers may be cross-linked by treatment with suitable polyvalent metal compounds, e.g., zinc acetate, basic aluminum acetate, zirconium acetyl acetonate. The cross-linking reaction is carried out by treating the film, fiber or shaped object prepared from the carboxyl-containing polymer with an aqueous or organic solution of the metal compound. The carboxyl-containing polymer may also be compounded with metal oxides such as zinc oxide, magnesium oxide or lead oxide and extruded or molded into crosslinked shaped objects.

Treatment of the carboxyl-containing polymers with monovalent compounds such as sodium hydroxide, potassium hydroxide or lithium hydroxide may be carried out by contacting the polymer with the solid inorganic compound or with an aqueous solution thereof. The resulting salt form of the carboxyl-containing polymer has increased strength as well as modified properties, e.g. increased water vapor permeability. The salt form can be extruded or molded into shaped objects.

Treatment of the carboxyl-containing polymer with a monovalent metal hydroxide, e.g. sodium hydroxide or ammonium hydroxide, or with an organic amine such as triethylamine or ethanolamine increases the water dispersibility. Aqueous dispersions prepared therefrom may be coated on substrates such as paper, wood or metal as well as fibers and, after drying, yield coated substrates with strongly adherent coatings.

The carboxyl-containing polymers may be converted into fine powders and used in the fluid bed coating of heated substrates, e.g. metal objects, to give adherent coatings. The powdered carboxyl-containing polymers may also be readily dispersed in aqueous amine or inorganic base solutions.

The carboxyl-containing polymers are polyanionic in nature and may be combined with polycationic polymers to yield polyelectrolyte complexes. The latter are insoluble in water but are solubilized in simple electrolyte solutions, e.g. lithium chloride. In this form they may be converted into membranes which are useful in dialysis and selective filtration.

In a most useful version of the present invention, the carboxylation of a polymer with the styrene-maleic anhydride mixture may be carried out in an extruder and converted directly into a shaped object such as an injection molded shape or an extruded film and fiber. In this manner a fiber or film containing carboxyl group may be prepared directly from an untreated polymer by conducting the carboxylation reaction in the extruder barrel.

A molder, converter, film manufacturer or fiber producer may thus use an inexpensive conventional polymer and by carrying out the carboxylation reaction during the normal extrusion step produce a carboxyl-containing molded object, film or fiber, equivalent to the product obtained by fabricating the more expensive carboxyl-containing polymer. The resultant carboxyl-containing film or fiber may be used and/or treated in the same manner as the shaped product prepared from a carboxyl-containing polymer.

The following examples illustrate this version of the present invention but are in no way intended to limit the obvious variations thereof.

EXAMPLE 4

Carboxylated Polyethylene Film

A conventional single screw extruder is heated to maintain a melt temperature of 230°–260° C. for low density polyethylene or 260°–320° C. for high density polyethylene. The extruder is modified so as to permit injection of the styrene-maleic anhydride carboxylation mixture into either the rear, center or front heating zones. The pelletized polymer is fed into the cold end of the screw extruder where it is heated and then transported by the revolving screw through the various heating zones. The styrene-maleic anhydride solution previously heated to 60° C., is injected under nitrogen or other inert gas pressure into the heated barrel through the appropriate opening into one of the heating zones where it comes in contact with the fluid polyethylene. The resultant molten carboxylated polyethylene is transported by the helical screw to a flat die for slot-die casting or to a circular die for blown-bubble extrusion.

The flat sheet which is extruded from the die is quenched by extrusion onto either a chilled drum or a liquid bath. The quenched film is then either wound on a roll in the usual manner or stretched into an oriented film before winding on a roll.

The tube which is extruded from the circular die is expanded into a bubble by internal air pressure, cooled by external air pressure and collapsed by nip rolls before winding up on a roll.

The extruder may be equipped with a vent to remove any residual gaseous monomer from the carboxylated polyethylene before extrusion through the die.

EXAMPLE 5

Carboxylated polypropylene Fibers

To process polypropylene a vented extruder is heated so as to provide a melt temperature of 270°–320 ° C. After carboxylation, as described in Example 4, the molten carboxylated polypropylene is forced through a spinneret. The polymer emerging from the orifices in the spinneret is led to a cooling zone where it solidifies. The filaments of carboxylated polypropylene are then stretched before winding on a spool or combined and twisted to produce a multifilament yarn.

The monofilaments may be formed into a non-woven web after stretching. Alternatively the carboxylated polypropylene may be spun directly from the melt into a non-woven web and bonded in situ.

What is claimed is:

1. A process for production of a carboxyl-containing polymer which comprises adding a solution of maleic anhydride in styrene which is maintained at a temperature of 50° to 70° C. to a fluid polymer having active hydrogen atoms in the absence of a solvent at a temperature of above about 120° C.

2. The process of claim 1 in which the mixture of styrene and maleic anhydride is maintained at a temperature of 50°–70° C. and is added to the polymer undergoing deformation.

3. The process of claim 1 in which the mixture of styrene and maleic anhydride contains 1 to 1.5 moles of styrene per mole of maleic anhydride.

4. The process of claim 1 in which the reaction is carried out at 150°–250° C.

5. The process of claim 1 in which at least 10 percent of the total hydrogen atoms present on the polymer reacted are active hydrogen atoms.

6. The process of claim 5 in which the polymer reacted is cis-polybutadiene.

7. The process of claim 5 in which the polymer reacted is polystyrene.

8. The process of claim 5 in which the polymer reacted is polyethylene.

9. The process of claim 5 in which the polymer reacted is polypropylene.

10. The process of claim 5 in which the polymer reacted is polyvinyl chloride.

11. The process of claim 5 in which the polymer reacted is ethylene-propylene rubber.

12. The process of claim 5 in which the polymer reacted is a nitrile rubber.

13. The process of claim 1 in which the said reaction is carried out during fabrication of said polymer to yield a carboxylated shaped polymer product.

14. The process of claim 13 in which the product is a film.

15. The process of claim 13 in which the product is a fiber.

* * * * *